United States Patent
Kuchana et al.

(10) Patent No.: US 9,534,497 B2
(45) Date of Patent: Jan. 3, 2017

(54) INTER-TURBINE DUCTS WITH VARIABLE AREA RATIOS

(75) Inventors: Vinayender Kuchana, Andhra Pradesh (IN); Balamurugan Srinivasan, Karnataka (IN); Sujatha Guntu, Andhra Pradesh (IN); Malak Fouad Malak, Tempe, AZ (US); Paul Couey, Tempe, AZ (US); Craig Mckeever, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1242 days.

(21) Appl. No.: 13/462,738

(22) Filed: May 2, 2012

(65) Prior Publication Data
US 2013/0294908 A1 Nov. 7, 2013

(51) Int. Cl.
*F01D 9/04* (2006.01)
*F01D 5/14* (2006.01)

(52) U.S. Cl.
CPC ............... *F01D 5/145* (2013.01); *F01D 9/041* (2013.01); *Y02T 50/671* (2013.01); *Y02T 50/673* (2013.01)

(58) Field of Classification Search
CPC ................ F01D 1/02; F01D 1/04; F01D 1/10; F01D 1/18; F01D 1/20; F01D 1/24; F01D 1/26; F01D 9/023; F01D 5/145; F04D 29/541; F04D 29/545; F04D 29/547
See application file for complete search history.

(56) References Cited

U.S. PATENT DOCUMENTS

| | | | |
|---|---|---|---|
| 5,531,400 A | 7/1996 | Demidov et al. |
| 5,845,482 A | 12/1998 | Carscalley |
| 6,488,470 B1 | 12/2002 | Owczarek |
| 6,851,264 B2 | 2/2005 | Kirtley et al. |
| 7,101,146 B2 | 9/2006 | Coull et al. |
| 7,137,245 B2 | 11/2006 | Graziosi et al. |
| 7,549,282 B2 | 6/2009 | Widenhoefer et al. |
| 7,610,179 B2 | 10/2009 | Florea et al. |
| 7,765,789 B2 | 8/2010 | Johnson |
| 7,854,586 B2 | 12/2010 | Major et al. |

(Continued)

FOREIGN PATENT DOCUMENTS

| | | |
|---|---|---|
| EP | 1643083 A2 | 4/2006 |
| EP | 1914385 A2 | 4/2008 |
| EP | 2159398 A2 | 3/2010 |

OTHER PUBLICATIONS

EP Communication, EP 13163242.4-1610 dated Mar. 9, 2013.
(Continued)

*Primary Examiner* — Richard Edgar
(74) *Attorney, Agent, or Firm* — Lorenz & Kopf, LLP

(57) ABSTRACT

A turbine section of a gas turbine engine is annular about a longitudinal axis. The turbine section includes a first turbine with a first inlet and a first outlet; a second turbine with a second inlet and a second outlet; and an inter-turbine duct extending from the first outlet to the second inlet and configured to direct an air flow from the first turbine to the second turbine. The inter-turbine duct has a first station with a first meridional area, a second station with a second meridional area, and a third station with a third meridional area. The first station is upstream of the second station and the second station is upstream of the third station, and the second meridional area is less than or equal to the first meridional area.

20 Claims, 5 Drawing Sheets

(56) References Cited

U.S. PATENT DOCUMENTS

| | | | |
|---|---|---|---|
| 7,870,719 B2* | 1/2011 | Lee | F01D 5/143 |
| | | | 313/362.1 |
| 8,061,980 B2 | 11/2011 | Praisner et al. | |
| 2005/0279100 A1* | 12/2005 | Graziosi | F01D 5/145 |
| | | | 60/772 |
| 2006/0045732 A1 | 3/2006 | Durocher et al. | |
| 2006/0185346 A1 | 8/2006 | Rolt | |
| 2007/0207035 A1* | 9/2007 | Girgis | F01D 5/141 |
| | | | 416/223 A |
| 2008/0056893 A1 | 3/2008 | Marini et al. | |
| 2008/0056894 A1 | 3/2008 | Tsifourdaris et al. | |
| 2009/0139202 A1 | 6/2009 | Agrawal et al. | |
| 2010/0040462 A1 | 2/2010 | Praisner et al. | |
| 2011/0079019 A1 | 4/2011 | Durocher et al. | |
| 2012/0275922 A1* | 11/2012 | Praisner | F01D 9/041 |
| | | | 416/223 A |

OTHER PUBLICATIONS

Gottlich, E.; Research on the aerodynamics of intermediate turbine diffusers; Progress in Aerospace Sciences 47 (2011) 249-279.
U.S. Appl. No. 13/204,338, filed Aug. 5, 2011.
USPTO Notice of Allowance for U.S. Appl. No. 13/204,338, dated May 28, 2014.
EP Search Report, EP 13163242.4-1610 dated Aug. 21, 2013.
USPTO Office Action for U.S. Appl. No. 13/204,338 dated Feb. 4, 2014.
EP Communication for Application No. 13163242.4-1610 dated Sep. 14, 2015.

\* cited by examiner

INTER-TURBINE DUCTS WITH VARIABLE AREA RATIOS

TECHNICAL FIELD

The present invention generally relates to gas turbine engines, and more particularly relates to inter-turbine ducts between the turbines of gas turbine engines.

BACKGROUND

A gas turbine engine may be used to power various types of vehicles and systems. A gas turbine engine may include, for example, five major sections: a fan section, a compressor section, a combustor section, a turbine section, and an exhaust nozzle section. The fan section induces air from the surrounding environment into the engine and accelerates a fraction of this air toward the compressor section. The remaining fraction of air induced into the fan section is accelerated through a bypass plenum and exhausted. The compressor section raises the pressure of the air it receives from the fan section and directs the compressed air into the combustor section where it is mixed with fuel and ignited. The high-energy combustion products then flow into and through the turbine section, thereby causing rotationally mounted turbine blades to rotate and generate energy. The air exiting the turbine section is exhausted from the engine through the exhaust section.

In some engines, the turbine section is implemented with one or more annular turbines, such as a high pressure turbine and a low pressure turbine. The high pressure turbine may be positioned upstream of the low pressure turbine and configured to drive a high pressure compressor, while the low pressure turbine is configured to drive a low pressure compressor and a fan. The high pressure and low pressure turbines have optimal operating speeds, and thus, optimal radial diameters that are different from one another. Because of this difference in radial size, an inter-turbine duct is arranged to fluidly couple the outlet of the high pressure turbine to inlet of the low pressure turbine and to transition between the changes in radius. It is advantageous from a weight and efficiency perspective to have a relatively short inter-turbine duct. However, decreasing the length of the inter-turbine duct increases the radial angle at which the air must flow between the turbines. Increasing the angle of the duct over a relatively short distance may result in boundary layer separation of the flow within the duct, which may adversely affect the performance of the low pressure turbine. Accordingly, the inter-turbine ducts are designed with a compromise between the overall size and issues with boundary layer separation. As a result, some conventional gas turbine engines may be designed with elongated inter-turbine ducts or inter-turbine ducts that do not achieve the optimal size ratio between the high pressure turbine and the low pressure turbine.

Accordingly, it is desirable to provide gas turbine engines with improved inter-turbine ducts. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a turbine section of a gas turbine engine is annular about a longitudinal axis. The turbine section includes a first turbine with a first inlet and a first outlet; a second turbine with a second inlet and a second outlet; and an inter-turbine duct extending from the first outlet to the second inlet and configured to direct an air flow from the first turbine to the second turbine. The inter-turbine duct has a first station with a first meridional area, a second station with a second meridional area, and a third station with a third meridional area. The first station is upstream of the second station and the second station is upstream of the third station, and the second meridional area is less than or equal to the first meridional area.

In accordance with another exemplary embodiment, an inter-turbine duct is provided extending between a first turbine having a first radial diameter and a second turbine having a second radial diameter, the first radial diameter being less than the second radial diameter. The inter-turbine duct includes a hub and a shroud circumscribing the hub to form a flow path fluidly coupled to the first turbine and the second turbine. The hub and shroud converge or maintain a constant separation with respect to meridional area in a first portion, and the hub and shroud diverge relative to one another in a second portion with respect to meridional area.

BRIEF DESCRIPTION OF THE DRAWINGS

The present invention will hereinafter be described in conjunction with the following drawing figures, wherein like numerals denote like elements, and FIG. 1 a schematic cross-sectional view of a gas turbine engine in accordance with an exemplary embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide gas turbine engines with improved inter-turbine ducts. In one exemplary embodiment, the inter-turbine duct is positioned between a high pressure turbine with a relatively small radial diameter and a low pressure turbine with a relatively large radial diameter. The inter-turbine duct may be defined by a shroud forming an outer boundary and a hub forming an inner boundary. As such, the meridional area of the flow path of the inter-turbine duct is defined between the hub and the shroud at any axial position, and the change in the meridional area along the length of the inter-turbine duct may be referred to as the meridional area ratio. In one exemplary embodiment, the meridional area ratio distribution is constant or decreases (e.g., the areas are constant or converge in a downstream direction) in a forward portion of the inter-turbine duct, and the meridional area ratio distribution increases (e.g., the areas diverge in a downstream direction) at an aft portion of the inter-turbine duct. These configurations may reduce separation of the air flow from the shroud wall, and thus, reduce pressure losses in the inter-turbine ducts.

Figure 1:
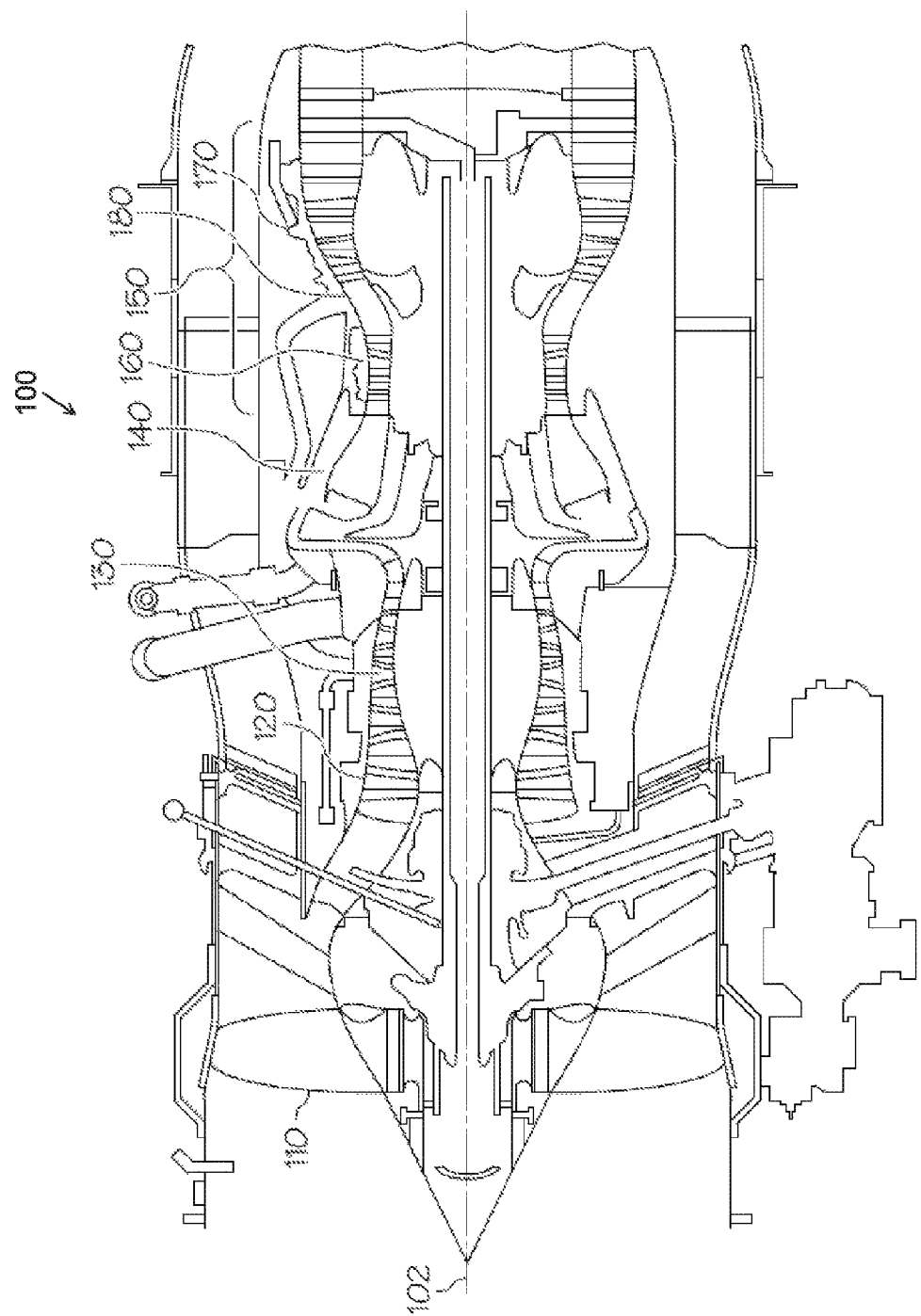

FIG. 1 a schematic cross-sectional view of a gas turbine engine 100 in accordance with an exemplary embodiment. As shown, the engine 100 may be an annular structure about a longitudinal or axial centerline axis 102. In the description that follows, the term "axial" refers broadly to a direction parallel to the axis 102 about which the rotating components of the engine 100 rotate. This axis 102 runs from the front of the engine 100 to the back of the engine 100. The term "radial" refers broadly to a direction that is perpendicular to the axis 102 and points towards or away from the axis of the engine 100. A "circumferential" direction at a given point is a direction that is normal to the local radial direction and normal to the axial direction. As such, the term "axial-circumferential" plane generally refers to the plane formed by the axial and circumferential directions, and the term "axial-radial" plane generally refers to the plane formed by the axial and radial directions. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

The engine 100 generally includes, in serial flow communication, a fan section 110, a low pressure compressor 120, a high pressure compressor 130, a combustor 140, and a turbine section 150, which may include a high pressure turbine 160 and a low pressure turbine 170. During operation, ambient air enters the engine 100 at the fan section 110, which directs the air into the compressors 120 and 130. The compressors 120 and 130 provide compressed air to the combustor 140 in which the compressed air is mixed with fuel and ignited to generate hot combustion gases. The combustion gases pass through the high pressure turbine 160 and the low pressure turbine 170. As described in greater detail below, an inter-turbine duct 180 couples the high pressure turbine 160 to the low pressure turbine 170.

The high pressure turbine 160 and low pressure turbine 170 are used to provide thrust via the expulsion of the exhaust gases, to provide mechanical power by rotating a shaft connected to one of the turbines, or to provide a combination of thrust and mechanical power. As one example, the engine 100 is a multi-spool engine in which the high pressure turbine 160 drives the high pressure compressor 130 and the low pressure turbine 170 drives the low pressure compressor 120 and fan section 110.

Figure 2:
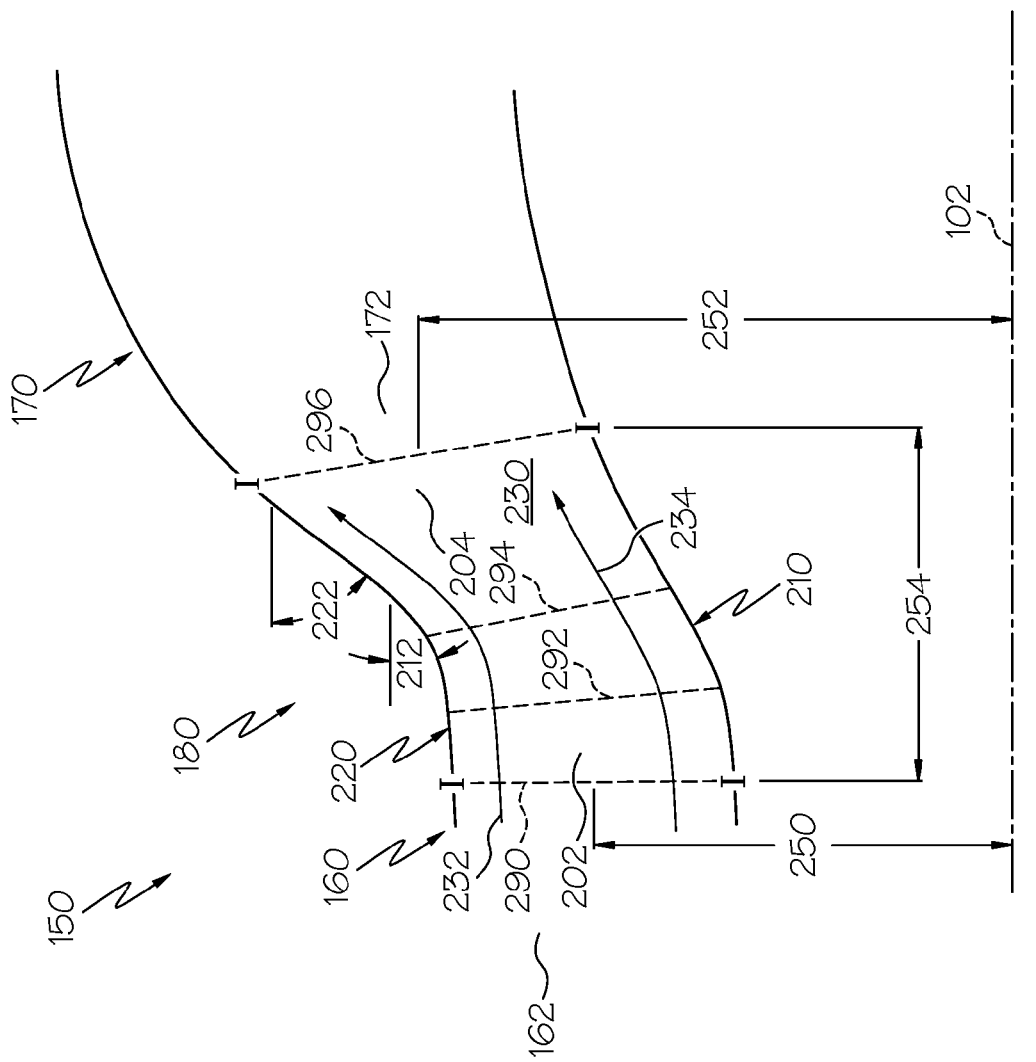
FIG. 2 is a schematic, partial cross-sectional view of a turbine section with an inter-turbine duct of the gas turbine engine of FIG. 1 in accordance with a first exemplary embodiment.

FIG. 2 is a schematic, partial cross-sectional view of a turbine assembly with an inter-turbine duct, such as the inter-turbine duct 180 of the turbine section 150 of the engine 100 of FIG. 1 in accordance with an exemplary embodiment.

As shown, the turbine section 150 includes the high pressure turbine 160, the low pressure turbine 170, and the inter-turbine duct 180 fluidly coupling the high pressure turbine 160 to the low pressure turbine 170. Particularly, the inter-turbine duct 180 includes an inter-turbine duct inlet 202 coupled to a high pressure turbine outlet 162 and an inter-turbine duct outlet 204 coupled to a low pressure turbine inlet 172. The annular structure of the inter-turbine duct 180 is defined by a hub 210 and a shroud 220 to create a flow path 230 for air flow (e.g., air flow 232 and 234) between the high pressure and low pressure turbines 160 and 170.

As noted above, the inter-turbine duct 180 transitions from a first radial diameter 250 at the inlet 202 (e.g., corresponding to the radial diameter at the outlet 162 of the high pressure turbine 160) to a larger, second radial diameter 252 (e.g., corresponding to the radial diameter at the inlet 172 of the low pressure turbine 170). In one exemplary embodiment, as shown in FIG. 2, the radial diameters are measured from the mid-point of the inter-turbine duct 180 although such diameters may also be measured from the hub 210 and/or the shroud 220. This transition is provided over an axial length 254. The hub 210 and shroud 220 may have various shapes to transition between the radial diameters 250, 252 along the axial length 254. For example, the shroud 220 may extend at constant or changing angles (e.g., angles 212, 222), as described in greater detail below.

In general, it is advantageous to minimize the axial length 254 of the inter-turbine duct 180 for weight and efficiency. For example, a shorter axial length 254 may reduce the overall axial length of the engine 100 (FIG. 1) as well as reducing friction losses of the air flow 232, 234. However, as the axial length 254 is decreased, the orientation of the air flow 232, 234 must be more aggressively transitioned over a shorter length.

During operation, the inter-turbine duct 180 functions to direct the air flow 232, 234 along the radial transition between turbines 160 and 170. It is generally advantageous for the air flow 232, 234 to flow smoothly through the inter-turbine duct 180. Particularly, it is advantageous if the air flow 232 adjacent to the shroud 220 maintains a path along the shroud 220 instead of undergoing a boundary layer separation. However, as the axial length 254 decreases and the angle between the turbines 160, 170 increases, the air flow 232 tends to maintain an axial momentum through the inlet 202 and, if not addressed, attempts to separate from the shroud 220, particularly in upstream regions of the shroud 220. Such separations may result in vortices or other turbulence that result in undesirable pressure losses through the inter-turbine duct 180 as well as inefficiencies in the low pressure turbine 170.

The inter-turbine duct 180 may be considered with respect to duct or flowpath stations positioned along the axial length 254. In FIG. 2, examples of duct stations are labeled as duct stations 290, 292, 294, 296. Any number of stations may be defined and considered, and a station line for each station 290, 292, 294, 296, as shown, extends between a station point at a predetermined fractional distance along the surface of the hub 210 (e.g., 10% of the hub 210 along the surface from the inlet) and a corresponding station point at the same predetermined fractional distance along the surface of the shroud 220 (e.g., 10% of the shroud 220 along the surface from the inlet). Since the hub 210 and the shroud 220 may have different shapes, the station lines are not necessarily radial.

Figure 3:
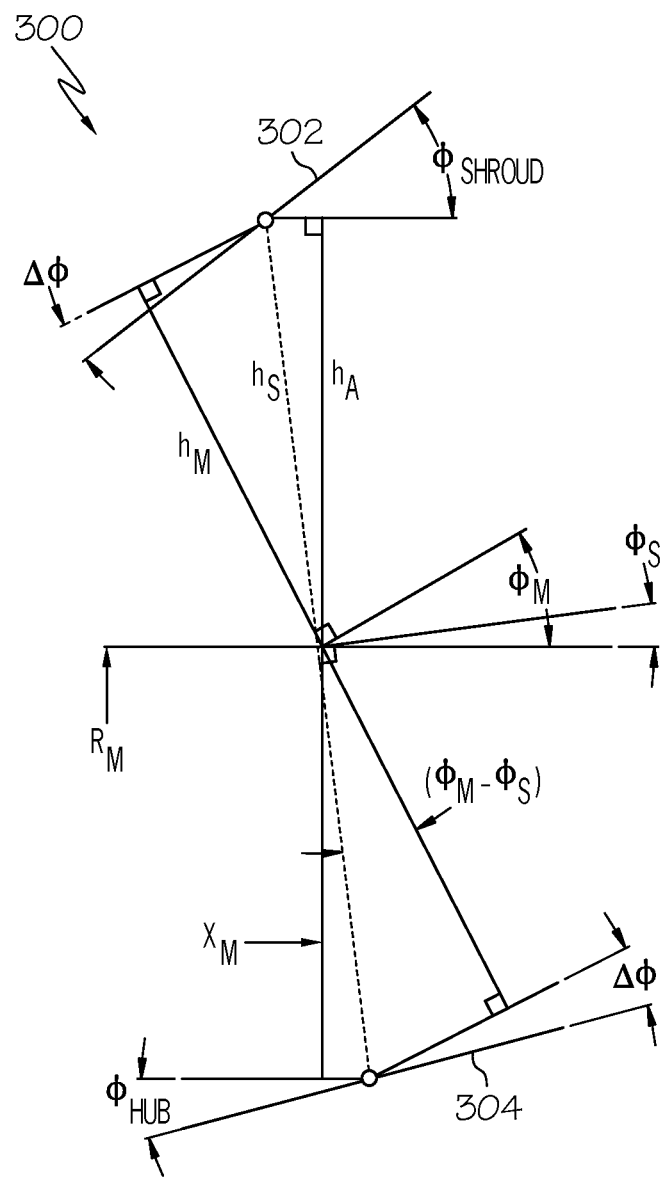
FIG. 3 is a schematic representation of a turbine section illustrating the meridional area of an inter-turbine duct of the gas turbine engine of FIG. 1 in accordance with an exemplary embodiment.

The area at any duct station 290, 292, 294, 296 may be defined with respect to meridional area. Reference is briefly made to FIG. 3, which is a schematic representation of a turbine section illustrating the meridional area of an inter-turbine duct at a station 300, e.g., station 290, 292, 294, 296 of FIG. 2.

In FIG. 3, the station 300 is defined by a shroud 302 and a hub 304, as above. A shroud angle or slope ($\Phi_{SHROUD}$)) of the shroud 302 relative to an axial reference and a hub angle or slope ($\Phi_{HUB}$) relative to the axial reference are labeled. The meridional flow corresponds to the air flow characteristics of the gases flowing through the station. Typically, a pitch or meridional angle ($\Phi_M$) of the meridional flow is evaluated. Since such a flow may vary between the shroud 302 and hub 304, a simplified meridional angle ($\Phi_M$) may be considered. The meridional angle ($\Phi_M$) may be calculated by averaging the flow vector along a station line height ($h_s$) or by taking the average of the shroud angle ($\Phi_{SHROUD}$)) and the hub angle ($\Phi_{HUB}$) at the axial endpoints of the station. In general, the station line height ($h_s$) is the length of the line segment defining the given station 300. In other words, any number of stations may be defined, and a station line height ($h_s$) extends between a station point at a predetermined fractional distance along the surface of the hub 304 (e.g., 10% of the hub 304 along the surface from the inlet) and a corresponding station point at the same predetermined fractional distance along the surface of the shroud 302 (e.g., 10% of the shroud 302 along the surface from the inlet). Since the hub 304 and the shroud 302 may have different shapes, the station line is not necessarily radial. The slope of a normal vector to the station line and the engine axis (or the angle between a radial vector ($h_A$) and the station line ($h_s$)) is labeled as the station angle ($\Phi_s$). The radial midpoint of the duct at the station from an engine centerline is labeled as radius ($R_M$). From these relationships, the meridional flow height ($h_M$) may be defined as follows in Equation (1):

$$h_M = h_S * \cos(\Phi_M - \Phi_S) \qquad \text{Eq. (1)}.$$

where $h_M$ is the station meridional height;
$h_S$ is the station height;
$\Phi_M$ is the meridional angle; and
$\Phi_S$ is the station angle.

Meridional area is defined as the projection of the station area normal to the notional flow direction as projected on the meridional view, as expressed in Equation (2):

$$A_M = 2\pi * R_M * h_M \qquad \text{Eq. (2)}.$$

where $A_M$ is the meridional area;
$R_M$ is the radial radius of the duct; and
$h_M$ is the meridional height.

Inter-turbine duct characteristics may be expressed as a meridional area ratio of the meridional area at a station relative to the meridional area of the duct inlet, as expressed in Equation (3):

$$MAR = A_{M\_STATION}/A_{M\_INLET} \qquad \text{Eq. (3)}$$

where

MAR is the meridional area ratio;
$A_{M\_STATION}$ is the meridional area at a given station; and
$A_{M\_INLET}$ is the meridional area at the duct inlet.

Now that meridional area and meridional area ratio have been defined, reference is again directed to FIG. 2. In accordance with an exemplary embodiment, a distribution of meridional area along the length 254 of the duct 180 may be defined to provide advantageous flow characteristics. In conventional inter-turbine ducts, the area ratio (e.g., the meridional area at any given station location divided by the meridional area at the inlet) is continuously increasing through the entire length of the duct. However, in one exemplary embodiment, the area distribution may be manipulated in a predetermined manner to impact the characteristics of the air flow through the inter-turbine duct 180, and in particular, to prevent or reduce separation of air flow from the shroud 220.

As an example, FIG. 2 depicts a meridional area ratio distribution that is "converging/diverging." In other words, the meridional area ratio decreases (or converges) from the inlet to a predetermined distance from the inlet 202. In this embodiment, the meridional area ratio then increases (or diverges) along the axial length 254 to the outlet 204 of the duct 180. Using the depicted embodiment as an example, the meridional area at station 290 is greater than the meridional area at station 292, which is greater than the meridional area at station 294. As such, the meridional areas are decreasing or converging through the first three stations 290, 292, and 294. However, the meridional area at station 294 is less than the meridional area at station 296, thus resulting in an increasing or diverging meridional area distribution.

The position at which the meridional area ratio transitions from converging to diverging may be at any axial length. In the depicted embodiment, the axial position is about 20% of the axial length, although in other embodiments, the axial position may be about 15% to about 80%. The length of duct 180 from the inlet 202 to the predetermined distance may be referred to as the first portion and the length of the duct 180 from the predetermined distance may be referred to as the second portion, such that the first portion has a converging area ratio distribution and the second portion has a diverging area ratio distribution. In the depicted exemplary embodiment, the position of station 294 may correspond to the predetermined distance at which the duct 180 starts to diverge. In one exemplary embodiment, the meridional area ratio distribution in the first portion is continuously converging and the meridional area ratio distribution in the second portion is continuously diverging.

Figure 4:
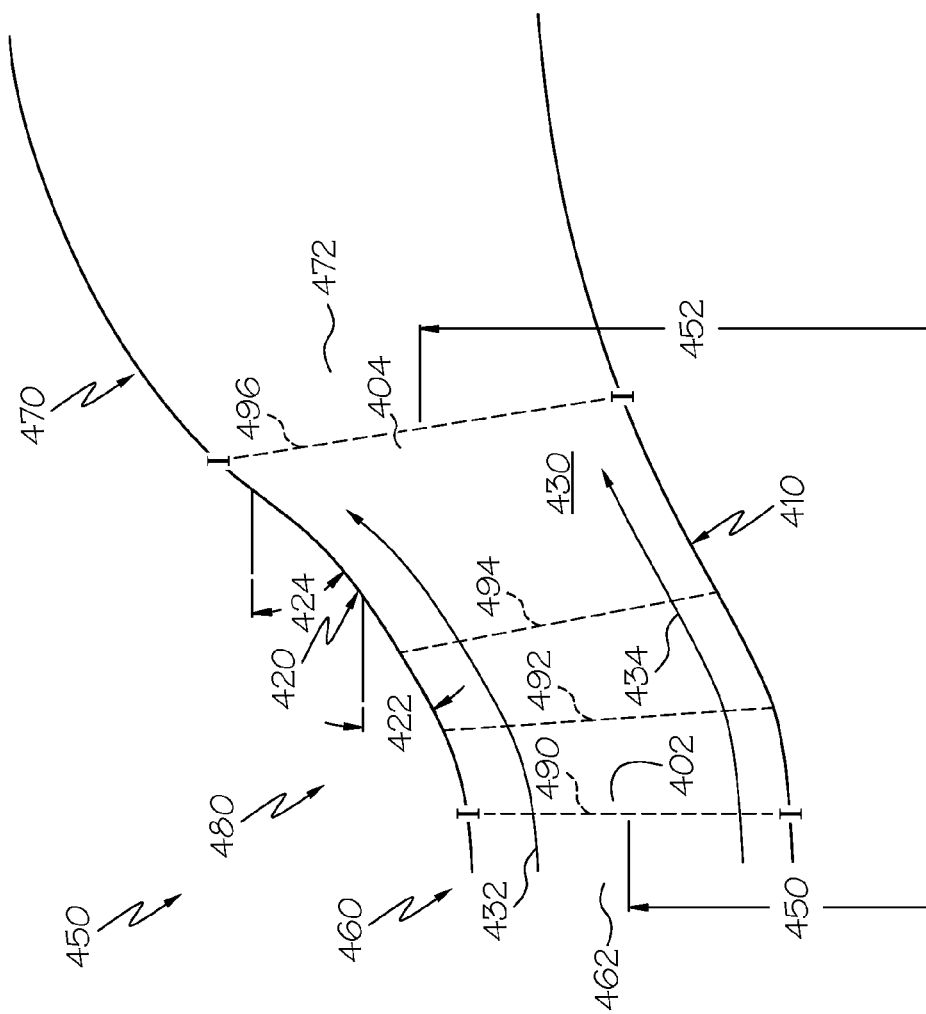
FIG. 4 is a schematic, partial cross-sectional view of a turbine section with an inter-turbine duct of the gas turbine engine of FIG. 1 in accordance with a second exemplary embodiment.

FIG. 4 is a schematic, partial cross-sectional view of a turbine section 450 with an inter-turbine duct 480 that may be implemented, for example, in the gas turbine engine 100 of FIG. 1 in accordance with a second exemplary embodiment.

As in the embodiments of FIGS. 1 and 2, the turbine section 450 includes a high pressure turbine 460, a low pressure turbine 470, and the inter-turbine duct 480 fluidly coupling the high pressure turbine 460 to the low pressure turbine 470. Particularly, the inter-turbine duct 480 includes an inlet 402 coupled to the outlet 462 of the high pressure turbine 460 and an outlet 404 coupled to the inlet 472 of the low pressure turbine 470. The annular structure of the inter-turbine duct 480 is defined by a hub 410 and a shroud 420 to create a flow path 430 for air flow (e.g., air flow 432 and 434) between the high pressure and low pressure turbines 460, 470.

As noted above, the inter-turbine duct 480 transitions from a first radial diameter 450 at the inlet 402 to a larger, second radial diameter 412 over an axial length. The hub 410 and shroud 420 may have various shapes to transition between the radial diameters 450, 452 along the axial length. For example, the shroud 420 may extend at constant or changing angles (e.g., angles 422, 424) to prevent boundary layer separation, as described in greater detail below.

In the view of FIG. 4, the stations 490, 492, 494, 496 are schematically depicted between the hub 410 and shroud 420 at various positions along the inter-turbine duct 480. As an example, FIG. 4 depicts a meridional area ratio distribution that is "constant/diverging." In other words, the meridional area ratio is constant from the inlet 402 to a predetermined axial distance from the inlet 402. In this embodiment, the meridional area ratio then increases (or diverges) along the axial length to the outlet of the duct 480. Using the depicted embodiment as an example, the meridional area at station 490 is equal than the meridional area at station 492 and the meridional area at station 494. As such, the meridional areas are constant through the first three stations 490, 492, and 494. However, the meridional areas at stations 490, 492, and 494 are less than the meridional area at station 496, thus resulting in an increasing or diverging meridional area distribution.

The position at which the meridional area ratio transitions from converging to diverging may be at any axial length. In the depicted embodiment, the axial position is about 20% of the axial length, although in other embodiments, the axial position may be about 15% to about 80%. In one exemplary embodiment, the meridional area ratio distribution in the first portion is continuously constant and the meridional area ratio distribution in the second portion is continuously diverging.

Figure 5:
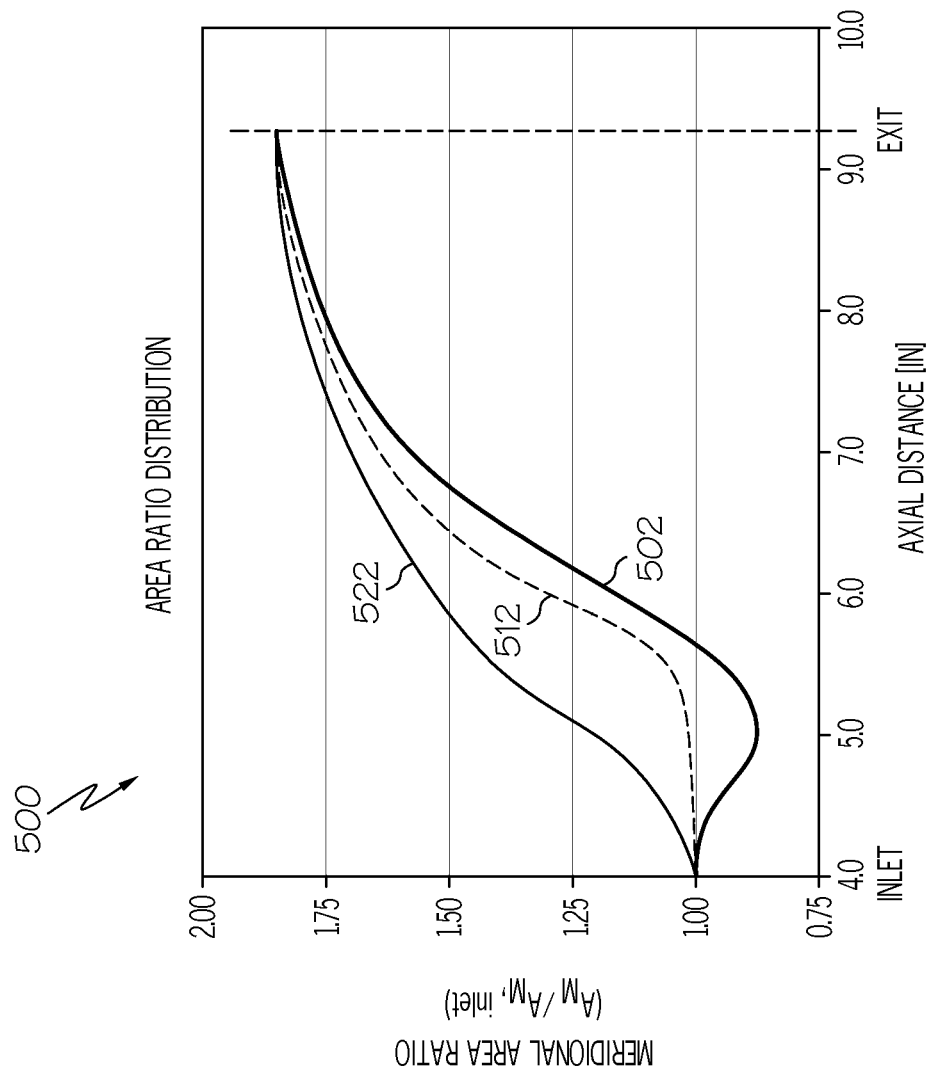
FIG. 5 is a chart depicting meridional area ratio as a function of axial distance in accordance with an exemplary embodiment.

FIG. 5 is a chart 500 depicting meridional area ratio as a function of axial distance of the duct section (e.g., duct sections 180 and 480 of FIGS. 2 and 4) in accordance with an exemplary embodiment. As noted above, the meridional area ratio may be defined as the meridional area at a given axial station location divided by the meridional area at the inlet of the duct. As also above, the meridional area ratio may be designed to provide advantageous flow characteristics.

In another exemplary embodiment represented by line 502, the meridional area ratio distribution is "converging/diverging," such as the duct 180 shown in FIG. 2. In other words, the meridional area ratio decreases (or converges) from the inlet to a predetermined axial distance from the inlet. In this embodiment, the meridional area ratio then increases (or diverges) along the axial length to the outlet of the duct. The position at which the meridional area ratio transitions from converging to diverging may be at any axial length. In the depicted embodiment, the axial position is about 20% of the axial length, although in other embodiments, the axial position may be about 15% to about 80%.

In one exemplary embodiment represented by line 512, the meridional area ratio distribution is "constant/diverging," such as the duct 480 shown in FIG. 4. In other words, the meridional area ratio is constant from the inlet to a predetermined axial distance from the inlet. In this embodiment, the meridional area ratio then increases (or diverges) along the axial length to the outlet of the duct. The position at which the meridional area ratio transitions from constant to diverging may be at any axial length. In the depicted embodiment, the axial position is about 20% of the axial length, although in other embodiments, the axial position may be about 15% to about 80%.

As a comparison, the area ratio distribution of an exemplary conventional duct is illustrated by line 522. Typically, the area ratio distribution is not a consideration for conventional duct designers, although the resulting ducts general have continuously diverging meridional area ratios along the entire length.

The particular location at which the area ratio increases, as well as the amount of increase, may be selected based on computational fluid dynamics (CFD) analysis of various flow rates through the inter-turbine duct and/or weight, installation, cost or efficiency considerations. In general, active devices, such as flow injectors, and additional structures, such as guide vanes, are not necessary to maintain a smooth flow through the inter-turbine duct, particularly along the shroud. In one exemplary embodiment, the flow negotiates both the sharp bend (radially outward) in flow direction in the early portion of the duct and an area increase as the flow progresses from the inlet to the exit. In the depicted embodiments, maintaining constant area or, in fact, a converging area in the region of the initial bend, and then later having the area increase, enables flow to negotiate the bend without separating along the shroud. By constricting or maintaining area through these area functions, mean flow velocities are higher and peak velocity in the flow near the shroud is reduced, thereby lowering the total diffusion on the shroud and reducing the risk of separation. In particular, the radial angle of the inter-turbine duct may be increased and/or the axial length may be decreased to reduce the overall length and weight of the engine and to reduce friction and pressure losses in the turbine section.

The relatively compact nature of the flow control scheme also enables retrofitting of existing engines and engine designs with a minimum of additional complexity. In general, the techniques described above can be applied either during the design of a new engine to take advantage of the shorter duct length and optimized area-ratio made possible by the boundary layer control, or to retrofit an existing engine or engine design in order to improve the efficiency of the engine while changing the design as little as possible. Additionally, existing engines may be shortened for weight reduction and rotor-dynamic improvement enables by shortening the bearing span. Although reference is made to the exemplary gas turbine engine depicted in FIG. 1, it is contemplated that the inter-turbine ducts discussed herein may be adapted for use with other types of turbine engines including, but not limited to steam turbines, turboshaft turbines, water turbines, and the like. Moreover, the turbine engine described above is a turbofan engine for an aircraft, although exemplary embodiments may include without limitation, power plants for ground vehicles such as locomotives or tanks, power-generation systems, or auxiliary power units on aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine section of a gas turbine engine, the turbine section being annular about a longitudinal axis, the turbine section comprising:
   a first turbine with a first inlet and a first outlet;
   a second turbine with a second inlet and a second outlet; and an inter-turbine duct extending from the first outlet to the second inlet and configured to direct an air flow from the first turbine to the second turbine, the inter-turbine duct having a first station with a first meridional area, a second station with a second meridional area, and a third station with a third meridional area, wherein the first station is upstream of the second station and the second station is upstream of the third station, and wherein the second meridional area is less than or equal to the first meridional area.

2. The turbine section of claim 1, wherein the third area meridional ratio is greater than the first meridional area ratio and the second meridional area ratio.

3. The turbine section of claim 1, wherein the first meridional area is calculated according to the following Equation:

$$A_M = 2\pi * R_M * h_M$$

where $A_M$ is the first meridional area;
$R_M$ is a radius of the duct at the first station; and
$h_M$ is a meridional height at the first station.

4. The turbine section of claim 3, wherein the meridional height ($h_M$) is calculated according to the following Equation:

$$h_M = h_S * \cos(\Phi_M - \Phi_S)$$

where $h_M$ is the meridional height at the first station;
$h_S$ is a station height;
$\Phi_M$ is a meridional angle; and
$\Phi_S$ is a station angle.

5. The turbine section of claim 1, wherein the second meridional area is less that the first meridional area.

6. The turbine section of claim 5, wherein the inter-turbine duct has a first portion extending between the first station and the second station, wherein the first portion has a continuously converging meridional area distribution in the downstream direction.

7. The turbine section of claim 1, wherein the first meridional area is equal to the second meridional area.

8. The turbine section of claim 7, wherein the inter-turbine duct has a first portion extending between the first station and the second station, wherein the first portion has a continuously constant meridional area distribution in the downstream direction.

9. The turbine section of claim 1, wherein the inter-turbine duct has a first portion extending between the first station and the second station and a second portion extending between the second station and the third station, wherein the second portion has an continuously diverging meridional area distribution.

10. The turbine section of claim 1, wherein the first station is defined at an inlet of the inter-turbine duct.

11. The turbine section of claim 10, wherein the third station is defined at an outlet of the inter-turbine duct.

12. The turbine section of claim 1, wherein the inter-turbine duct has an axial length and a first portion extending between the first station and the second station, and wherein the first portion extends to about 15%-80% of the axial length.

13. The turbine section of claim 1, wherein the first turbine is a high pressure turbine and the second turbine is a low pressure turbine.

14. An inter-turbine duct extending between a first turbine having a first radial diameter and a second turbine having a second radial diameter, the first radial diameter being less than the second radial diameter, the inter-turbine duct comprising:

a hub; and a shroud circumscribing the hub to form a flow path fluidly coupled to the first turbine and the second turbine, wherein the hub and shroud converge or maintain a constant separation with respect to meridional area in a first portion and the hub and shroud diverge relative to one another in a second portion with respect to meridional area.

15. The inter-turbine duct of claim 14, wherein first portion is upstream of the second portion.

16. The inter-turbine duct of claim 14, wherein the first portion is continuously constant with respect to meridional area.

17. The inter-turbine duct of claim 14, wherein the first portion is continuously converging with respect to meridional area.

18. The inter-turbine duct of claim 14, wherein the second portion is continuously diverging.

19. The inter-turbine duct of claim 14, wherein the inter-turbine duct has an axial length, and wherein the first portion extends to about 15%-80% of the axial length.

20. A turbine section of a gas turbine engine, the turbine section being annular about a longitudinal axis, the turbine section comprising:

a high pressure turbine with a first inlet and a first outlet;

a low pressure turbine with a second inlet and a second outlet; and an inter-turbine duct extending from the first outlet to the second inlet and configured to direct an air flow from the first turbine to the second turbine, the inter-turbine duct having a first station with a first meridional area ratio, a second station with a second meridional area ratio, and a third station with a third meridional area ratio, wherein the first station is upstream of the second station and the second station is upstream of the third station, and wherein the second meridional area ratio is less than or equal to the first meridional area ratio, wherein the inter-turbine duct has an axial length and a first portion extending between the first station and the second station, and wherein the first portion extends to about 15%-80% of the axial length, and wherein the first meridional area is calculated according to the following Equation:

$$A_M = 2\pi * R_M * h_M$$

where $A_M$ is the first meridional area;
$R_M$ is a radius of the duct at the first station;
$h_M$ is a meridional height at the first station; and
wherein a meridional angle of the meridional height is determined by taking an average of a shroud angle ($\Phi_{SHROUD}$) and a hub angle ($\Phi_{HUB}$) at axial endpoints of the respective station.

* * * * *